United States Patent
Schiesterl

[11] 3,753,361
[45] Aug. 21, 1973

[54] STEERING WHEEL LOCK FOR AUTOMOTIVE VEHICLES

[75] Inventor: Gerhard Schiesterl, Stuttgart-Vaihingen, Germany

[73] Assignee: Daimler-Benz Aktiengesellschaft, Stuttgart-Unterturkheim, Germany

[22] Filed: Mar. 6, 1969

[21] Appl. No.: 804,851

[30] Foreign Application Priority Data
Mar. 6, 1968  Germany.................. P 16 80 023.0

[52] U.S. Cl. ............... 70/185, 70/371, 287/58 CT, 287/DIG. 9
[51] Int. Cl. .............................................. B60r 25/02
[58] Field of Search ...... 70/184–186, 252, 368, 371, 451; 292/74–75, 145, 337, DIG. 51, DIG. 52; 287/58 CT, DIG. 9; 339/75, 82

[56] References Cited
UNITED STATES PATENTS

| | | | |
|---|---|---|---|
| 2,801,123 | 7/1957 | Kubik et al. .................... | 292/352 |
| 1,589,169 | 6/1926 | Hugues ............................... | 70/185 |
| 2,295,723 | 9/1942 | Duncan .............................. | 70/186 |
| 2,496,737 | 2/1950 | McCallick et al. ............... | 70/208 X |
| 2,710,207 | 6/1955 | Mueller .............................. | 287/58 |

FOREIGN PATENTS OR APPLICATIONS

| | | | |
|---|---|---|---|
| 711,413 | 9/1931 | France .............................. | 292/352 |
| 379,431 | 3/1940 | Italy ................................... | 70/185 |

Primary Examiner—Albert G. Craig, Jr.
Attorney—Craig, Antonelli and Hill

[57] ABSTRACT

A steering wheel lock for automotive vehicles wherein the locking bolt which engages with the steering column is slidably disposed in a lock shaft which is keyed to a fixed mounting sleeve, the key to the mounting sleeve being selectively disengageable through translation thereof into a recess provided in the locking bolt only when the locking bolt is out of engagement with the steering column.

9 Claims, 3 Drawing Figures

PATENTED AUG 21 1973

3,753,361

INVENTOR
GERHARD SCHIESTERL

BY Craig, Antonelli, Stewart & Hill

ATTORNEYS

STEERING WHEEL LOCK FOR AUTOMOTIVE VEHICLES

The invention relates to a steering wheel lock for automotive vehicles wherein the steering gear is locked when the steering wheel shaft is in a certain position.

This anti-theft system required by law for automotive vehicles exhibits, in most cases, the disadvantage that the steering gear can be unlocked by disassembling and removing the lock mechanism, whereby theft and illegal use of the automotive vehicle is made possible. It is the objective of this invention to eliminate the above-described deficiencies and to produce a device wherein a disassembly of the lock mechanism is practically impossible when the latter is in the locked position.

Accordingly, a steering wheel lock for automobiles is proposed wherein, according to the invention, a locking bolt which locks into the steering wheel shaft is slidably disposed within a steering wheel lock shaft held in a mounting member provided in the vehicle construction; this steering wheel lock shaft is provided with a groove and a bore therein accommodating a necked-down bolt and a spring in biasing contact against the bolt within the groove, wherein a shank of the bolt having a larger diameter is positioned so that it is longitudinally displaceable therein to form a releasable key between the lock shaft and the mounting member.

In a preferred embodiment, the flat or round wire coil spring, which rests in the groove, the latter having the approximate shape of a circular segment, and which penetrates through the bolt, is secured by means of wedge pieces.

In a further construction of the invention, the mounting member provided in the vehicle construction has an oblong hole receiving the shank of the bolt having the smaller diameter; in this connection, the transition point to the shank of the bolt provided with the larger diameter resiliently contacts the inner rim of the oblong hole due to the bias from the spring.

The lock mechanism of this invention can be disassembled if the locking bolt has an indentation arranged and constructed in such a manner that, when the locking bolt is released from the steering wheel shaft, the necked-down bolt aligns with the indentation, so that by pressing its smaller-diameter shank therein, the bolt will free itself from the mounting member.

A simple assembly is obtained by providing the mounting member secured to the vehicle construction, starting from the insertion side of the steering wheel lock shaft, with at least one slot extending in the longitudinal direction, and by effecting the attachment of the guide member to the recess on the vehicle construction by means of a sleeve joint.

It is an object of the present invention to provide a lock arrangement for motor vehicle steering columns which prevents unauthorized disassembly and removal thereof in the locked position.

It is another object of the present invention to provide a lock arrangement of the type described which avoids or otherwise eliminates the difficulties and disadvantages inherent in known arrangements of a similar type.

It is a further object of the present invention to provide a lock arrangement of the type described which is extremely simple in construction and extremely effective in preventing tampering therewith in the locked position.

It is still another object of the present invention to provide a lock arrangement of the type described wherein a mounting sleeve is locked over and prevents removal of a locking bolt engaging with the steering wheel column in the locked position of the steering lock, the locking bolt being removable from the sleeve only in the unlocked position of the steering lock.

These and other objects, features, and advantages of the present invention will become more apparent from the following detailed description thereof, when taken in connection with the accompanying drawing, which shows, for purposes of illustration only, an embodiment in accordance with the present invention and wherein.

Figure 2A:
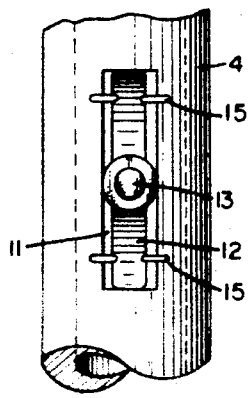
FIG. 2A is a partial, cross-sectional view of the steering wheel lock shaft.
Figure 1:
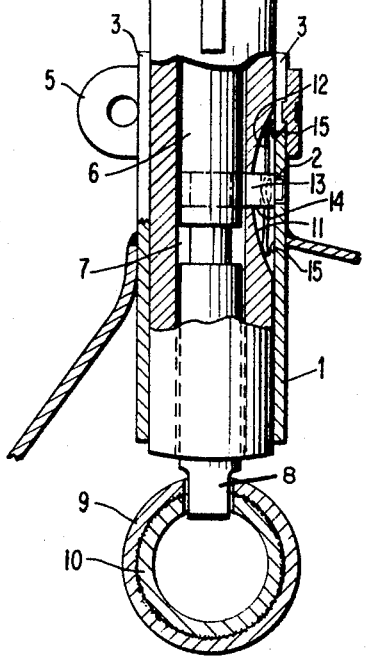
FIG. 1 is a sectional view of the steering wheel lock in accordance with the present invention.
Figure 2B:
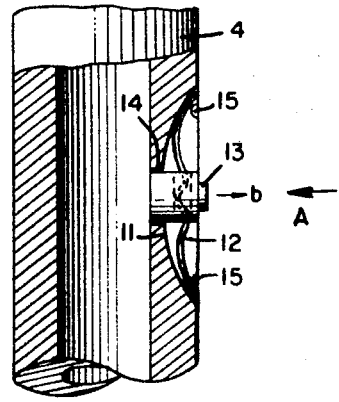
FIG. 2B is a partial, cross-sectional side view of the steering wheel lock shaft shown in FIG. 2A.

In the mounting sleeve 1 fixed to the vehicle structure, having a slot 3 in addition to an oblong hole 2, a steering wheel lock shaft 4 is mounted by means of a sleeve joint 5. A locking bolt 6, slidably disposed within the steering wheel lock shaft 4 in a longitudinally displaceable manner, is provided with an indentation 7 and terminates in a trunnion 8 extending out of the steering wheel lock shaft 4. When the automobile is duly parked, this trunnion 8 locks the mounting sleeve 1 of the steering wheel lock provided at the vehicle structure with the steering wheel shaft 10 and a lock ring 9 fixedly joined to the steering wheel shaft 10, thereby preventing rotation of the steering wheel. The steering wheel lock shaft 4 is provided with a groove 11, preferably in the form of a circular segment, and a bore 14 wherein a necked-down bolt 13 penetrated by a flat spring 12 is supported. The shank of this bolt 13 having the smaller diameter extends into the oblong hole 2 of the mounting sleeve 1 provided at the vehicle structure. Wedge pieces 15 prevent, during the installation of the steering wheel lock shaft 4, the flat spring 12 and the bolt 13 from jumping out of their fittings. FIG. 2A is a partial, cross-sectional view of the lock shaft 4 looking in the direction of arrow A in FIG. 2B. The flat spring 12 is shaped so that it tends to bias the bolt 13 out of the bore 14 in the direction of arrow b as shown in FIG. 2B. Without the presence of the wedge pieces 15, the flat spring 12 loosely inserted in the groove 11 and engaging the bolt 13 would jump out of the groove 11. The wedge pieces correspond, for example, to a simple deformation of the edge of the groove 11 and can be formed, for example, by chisel blows directed in such a manner that the flat spring 12 is held in the groove 11 by the deformed material.

The mode of operation of the device is as follows: Once the steering gear is locked by a corresponding steering wheel lock and steering wheel shaft position, the locking bolt 6 assumes the illustrated position with the trunnion 8 inserted into the steering wheel shaft 10. The indentation 7 and the bolt 13 are offset with respect to each other in this position, so that the latter cannot be pressed in and therefore locks the mounting sleeve 1 to the lock shaft 4 preventing removal of one from the other. A disassembly of the locking bolt 6 is even impossible when the sleeve joint 5 is removed, as can be seen from the drawing, unless the bolt can be depressed.

However, when the steering gear is unlocked, for example, in the steering wheel lock positions "garage" or "drive," the locking bolt 6 is displaced upwardly, as seen in the drawing until the indentation 7 assumes the position indicated in dashed lines. Now the bolt 13 is aligned with the indentation 7 and can be pressed down, whereupon the steering wheel lock can be exchanged by removing the lock shaft 4 from the mounting sleeve 1.

While I have shown and described one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are within the scope of those skilled in the art.

I claim:

1. A steerling wheel lock for locking the steering column of an automotive vehicle, comprising a mounting sleeve secured to a fixed vehicle body part and having a transverse hole formed therein, a hollow steering wheel lock shaft slidably disposed within said mounting sleeve and having a transverse bore formed therein, a keying bolt mounted within the bore in said steering wheel lock shaft and engaging the hole in said mounting sleeve so as to lock the former to the latter, and a locking bolt slidably disposed between engaging and disengaging positions within the hollow of said steering wheel lock shaft and having one end engaging with said steering column to prevent rotation thereof in said engaging position, wherein said keying bolt includes shoulder means for preventing withdrawal thereof outwardly through said hole in said mounting sleeve.

2. A steering wheel lock as defined in claim 1, wherein said steering wheel lock shaft is provided with a groove adjacent said transverse bore and spring means located in said groove and engaging said keying bolt for biasing said keying bolt into engagement with the hole in said mounting sleeve.

3. A steering wheel lock as defined in claim 2, wherein said spring means includes a flat spring engaging through said keying bolt and wedge pieces operatively associated with the edges of said groove for holding said flat spring within said groove so that the steering wheel lock shaft can be readily inserted in said mounting sleeve.

4. A steering wheel lock as defined in claim 2, wherein said keying bolt has a length in excess of the length of said bore in said steering wheel lock shaft.

5. A steering wheel lock as defined in claim 2, wherein said keying bolt is a necked-down bolt having a large diameter portion disposed in said bore of said steering wheel lock shaft and a small diameter portion engaging with said hole in said mounting sleeve, said shoulder means being formed by the transition surface between said large diameter and small diameter portions.

6. A steering wheel lock as defined in claim 5, wherein the transition surface between said large diameter and small diameter portions resiliently contacts the inner rim of said hole in said mounting sleeve.

7. A steering wheel lock as defined in claim 2, wherein said locking bolt includes an indentation of sufficient size to accommodate said keying bolt and positioned on said locking bolt so as to be in substantial registration with the bore in said steering wheel lock shaft only when said locking bolt is in said disengaging position.

8. A steering wheel lock as defined in claim 2, wherein said mounting sleeve is provided with at least one slot beginning at the end thereof wherein said steering wheel lock shaft is inserted and extending in the longitudinal direction of said mounting sleeve, and a sleeve joint securing said mounting sleeve to said steering wheel lock shaft by way of said slot.

9. A steering wheel lock as defined in claim 2, wherein said groove in said steering wheel lock shaft is approximately in the shape of a circular segment, and said spring means includes a flat spring secured in said groove and engaging said keying bolt.

* * * * *